United States Patent
Fedigan et al.

(10) Patent No.: US 12,388,273 B2
(45) Date of Patent: Aug. 12, 2025

(54) POWER MANAGEMENT UNIT ARCHITECTURE

(71) Applicant: Raytheon Company, Waltham, MA (US)

(72) Inventors: Stephen John Fedigan, Marana, AZ (US); Mahitha Velagapudi, Allen, TX (US); Grant Allen Sweer, Owens Cross Roads, AL (US); Derek L. Budisalich, Decatur, AL (US); Eric C. Maugans, Tucson, AZ (US); Andrew Thompson, Vail, AZ (US)

(73) Assignee: Raytheon Company, Arlington, VA (US)

( * ) Notice: Subject to any disclaimer, the term of this patent is extended or adjusted under 35 U.S.C. 154(b) by 209 days.

(21) Appl. No.: 18/131,171

(22) Filed: Apr. 5, 2023

(65) Prior Publication Data
US 2024/0339847 A1  Oct. 10, 2024

(51) Int. Cl.
*H02J 7/00* (2006.01)
*H01M 6/36* (2006.01)
*H01M 6/50* (2006.01)

(52) U.S. Cl.
CPC ............ *H02J 7/0025* (2020.01); *H01M 6/36* (2013.01); *H01M 6/5011* (2013.01); *H01M 6/5033* (2013.01); *H01M 6/5038* (2013.01); *H01M 6/5044* (2013.01); *H02J 7/0047* (2013.01)

(58) Field of Classification Search
CPC ........ H02J 7/0025; H02J 7/0047; H02J 7/342; H01M 6/36; H01M 6/5011; H01M 6/5033; H01M 6/5038; H01M 6/5044
See application file for complete search history.

(56) References Cited

U.S. PATENT DOCUMENTS

| | | | | |
|---|---|---|---|---|
| 3,639,773 A | * | 2/1972 | Ayd, III | H01M 6/5011 307/66 |
| 3,693,068 A | * | 9/1972 | Bogue | H01M 6/50 320/124 |
| 3,767,933 A | * | 10/1973 | Bogue | H02J 9/06 307/66 |

(Continued)

FOREIGN PATENT DOCUMENTS

DE    60124188 T2 *  8/2007  ............ F42C 15/40

OTHER PUBLICATIONS

International Search Report and Written Opinion of the International Searching Authority for Application No. PCT/US2024/014208 dated Jun. 6, 2024, 10 pp.

(Continued)

*Primary Examiner* — Jared Fureman
*Assistant Examiner* — Michael J Warmflash
(74) *Attorney, Agent, or Firm* — Bachman & LaPointe, P.C.

(57) ABSTRACT

A power management unit architecture including a set of batteries connected to a load via a bus; a controller in operative communication with the batteries; a telemetry unit in operative communication with the controller and the batteries; at least one power switch in operative communication with the controller, the batteries and the bus; a squib unit operatively connected to the batteries; wherein the controller is configured to pull a battery current from a first battery and drive the first battery current into a second battery responsive to a predetermined current.

19 Claims, 1 Drawing Sheet

(56) References Cited

U.S. PATENT DOCUMENTS

| | | | | |
|---|---|---|---|---|
| 7,893,561 B2* | 2/2011 | Weidenheimer | ...... | H02J 7/0024 |
| | | | | 307/71 |
| 8,330,419 B2* | 12/2012 | Kim | ............ | H01M 10/4257 |
| | | | | 320/120 |
| 8,508,191 B2* | 8/2013 | Kim | ............ | H02J 7/0024 |
| | | | | 320/132 |
| 10,529,995 B2* | 1/2020 | Miller, Jr. | ............ | H02J 7/0045 |
| 2022/0220867 A1* | 7/2022 | O'Donnell | ............ | F03G 6/071 |

OTHER PUBLICATIONS

Dagarin et al., Galileo Probe Battery System—an Update, Hughes Space and Communications Company, Battery Conference on Applications and Advances, Eleventh Annual, Long Beach, CA, IEEE, Jan. 1996, 7 pp.

* cited by examiner

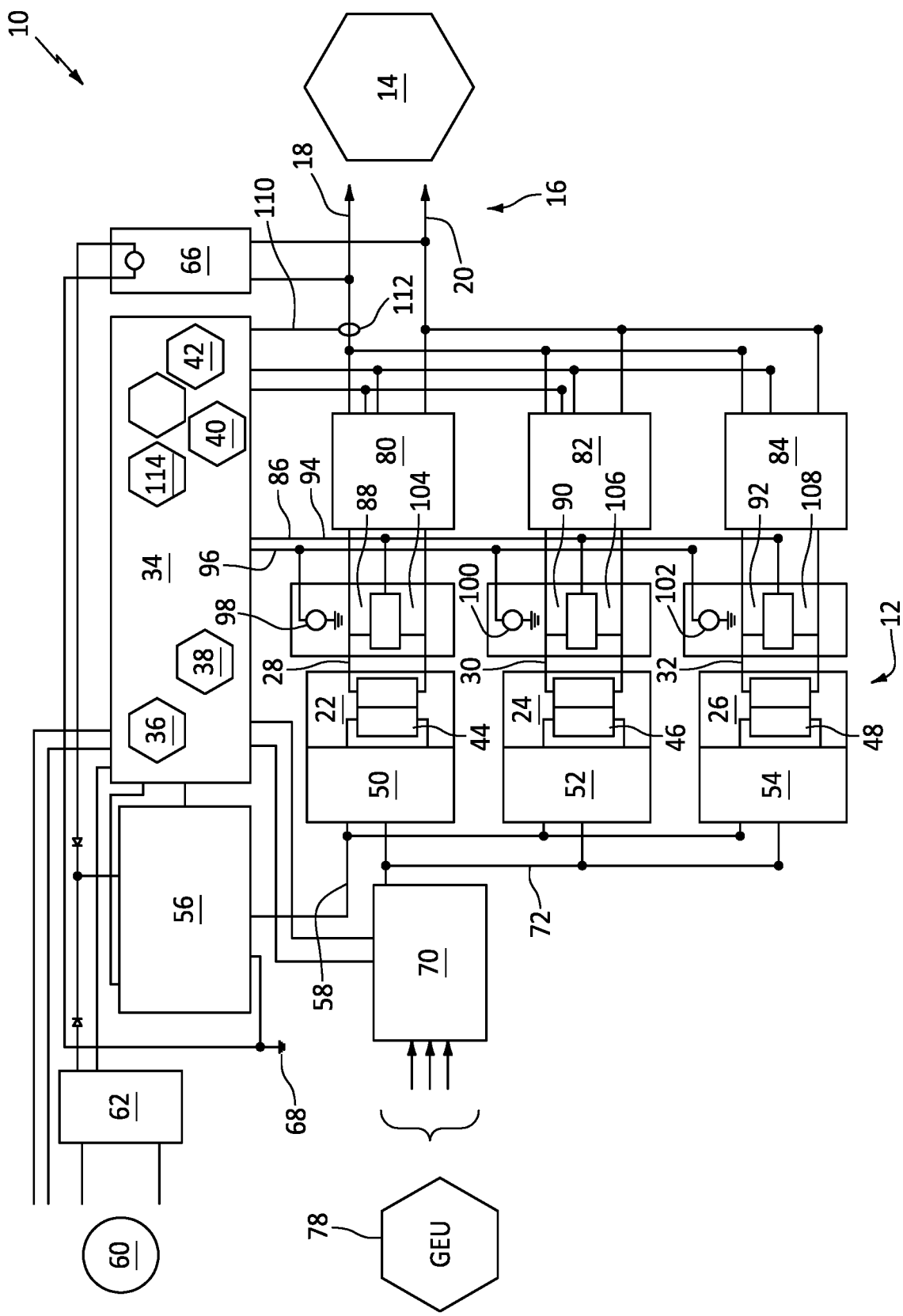

POWER MANAGEMENT UNIT ARCHITECTURE

BACKGROUND

The present disclosure is directed to a power management unit architecture that enables sequential firing of batteries.

Certain critical power applications require an electrical power source capable of ultrahigh reliability and ultralow maintenance and virtually unlimited shelf life. In such batteries, the electrodes are fully assembled for operation, but the electrolyte is held in reserve in a separate container which may be within the battery container. Since there is no consumption of the electrodes under these circumstances, the shelf life of the battery is essentially indefinite. However, once the electrolyte is released from its reserve container, such as by mechanical puncture, explosive squib rupture or by any other means as are well known in the art, the battery is activated and thereafter has a limited standby life. Thermal batteries are useful for applications requiring extended storage time because they avoid deterioration of the active materials during storage and eliminate the loss of capacity due to self-discharge. A key feature is that the electrolyte is frozen at room temperature and is melted by the activation of heat pellets. Thermal batteries can have multiple chemistries. For example, a eutectic mixture of inorganic salts with inorganic binder can serve as the electrolyte between the anode and the cathode. A conductive heat source, consisting of iron and potassium perchlorate, is placed between each cell. When initiated, the heat pellets ignite, releasing heat and melting the eutectic electrolyte, producing voltage and current.

A thermal battery is totally inert and non-reactive until activated. Because most external environments have little or no effect on the inactivated battery, it can be stored for 20+ years. The battery can be activated at any time without preparation and will begin supplying power almost immediately. After activation, the battery quickly reaches peak voltage, which declines gradually during the rest of its active life. Once activated, the battery functions until a critical active material is exhausted or until the battery cools below the electrolyte's melting point.

Thermal batteries can be utilized in groups such that a first battery can be activated and at a future point in time, a subsequent battery can be activated to take on the load. However, the first battery being taken offline is susceptible to thermal runaway conditions if the power being produced is not properly managed. The offline battery can go into a thermal runaway condition and have venting problems unless a minimum current is drawn from the offline battery to a point in time when the voltage drops below a value of 10% of full voltage. Typically, power resistors have been used to dissipate the offline thermal battery power being produced. However, the heat dissipated in the power resistors can create issues with surrounding electronics in the battery staging electronics module causing premature failure. The size of the power resistors can present electronics packaging issues as well.

What is needed is a power management unit architecture that allows for sequential firing of thermal batteries extending available battery power as well as allowing for offline battery management without the unwanted heat loads in the battery staging electronics package.

SUMMARY

In accordance with the present disclosure, there is provided a power management unit architecture comprising a first battery in operative communication with an electrical load via a bus; a second battery in operative communication with the electrical load via the bus and in operative communication with the first battery; an nth battery in operative communication with electrical load via the bus and in operative communication with an n−1th battery; a controller in operative communication with the first battery, the second battery and up to the nth battery; a first telemetry unit in operative communication with the controller and the first battery; a second telemetry unit in operative communication with the controller and the second battery; an nth telemetry unit in operative communication with the controller and the nth battery; a first power switch in operative communication with the controller, the first battery and the bus; a second power switch in operative communication with the controller, and the second battery and the bus; an nth power switch in operative communication with the controller, and the nth battery and the bus; a first squib unit operatively connected to the first battery; a second squib unit operatively connected to the second battery; an nth squib unit operatively connected to the nth battery, wherein the controller is configured to pull a first battery current from the first battery and drive the first battery current into the second battery responsive to a predetermined current; and the controller is configured to pull a second battery current from the second battery and drive the second battery current to an n−1th battery up to the nth battery responsive to a predetermined current.

A further embodiment of any of the foregoing embodiments may additionally and/or alternatively include the first battery is a thermal battery; the second battery is a thermal battery; and up to the nth battery is a thermal battery.

A further embodiment of any of the foregoing embodiments may additionally and/or alternatively include the first battery is activated and connected to the electrical load before the second battery is activated and connected to the electrical load and an n−1th battery is activated and connected to the electrical load before the nth battery is activated and connected to the electrical load.

A further embodiment of any of the foregoing embodiments may additionally and/or alternatively include the controller is configured to prevent the offline first battery from overheating and out-gassing and prevent the offline second battery from overheating and out-gassing.

A further embodiment of any of the foregoing embodiments may additionally and/or alternatively include periodically, at least one of a first battery current, a second battery current and up to an nth battery current are utilized in at least one of being applied to the load, charging another battery, being dumped as thermal energy and combinations thereof.

A further embodiment of any of the foregoing embodiments may additionally and/or alternatively include the controller is configured to pull at least one of the first battery current from the first battery and the second battery current from the second battery and up to an n−1th battery until a battery voltage reaches a target voltage of 10 percent of a full voltage value.

A further embodiment of any of the foregoing embodiments may additionally and/or alternatively include the controller is configured to transfer a charge from the first battery to the second battery, wherein the first battery is offline and the second battery is online; and wherein the controller is configured to transfer a charge from an n−1th battery to the nth battery, wherein the n−1th battery is offline and the nth battery is online.

A further embodiment of any of the foregoing embodiments may additionally and/or alternatively include the first telemetry unit, second telemetry unit and up to nth telemetry unit are configured to determine at least one of a battery impedance, a battery voltage, and a battery temperature.

A further embodiment of any of the foregoing embodiments may additionally and/or alternatively include the power management unit architecture further comprising a first squib multiplexer in operative communication with the first squib unit; a second squib multiplexer in operative communication with the second squib unit; and up to an nth squib multiplexer in operative communication with the nth squib unit; a squib driver circuit unit in operative communication with each of the first squib unit, the second squib unit and up to the nth squib unit; a firing interlock logic unit in operative communication with each of the first squib unit, the second squib unit and up to the nth squib unit, the controller and a guidance electronics unit configured to activate each of the first battery, the second battery and up to the nth battery.

In accordance with the present disclosure, there is provided a process for sequential activation of batteries connected to an electrical load comprising operatively connecting a first battery with the electrical load; subsequently operatively connecting a second battery with the electrical load and operatively connecting the second battery in communication with the first battery; operatively connecting a controller in operative communication with the first battery and the second battery; operatively connecting a first telemetry unit in operative communication with the controller and the first battery; operatively connecting a second telemetry unit in operative communication with the controller and the second battery; and configuring the controller to pull a first battery current from the first battery and drive the first battery current into the second battery responsive to a predetermined current.

A further embodiment of any of the foregoing embodiments may additionally and/or alternatively include the first battery is a thermal battery and the second battery is a thermal battery.

A further embodiment of any of the foregoing embodiments may additionally and/or alternatively include the process further comprising activating and connecting the first battery to the electrical load before activating and connecting the second battery to the electrical load.

A further embodiment of any of the foregoing embodiments may additionally and/or alternatively include the process further comprising configuring the controller to pull the first battery current from the first battery until the first battery voltage reaches a target voltage of 10 percent of a full voltage value.

A further embodiment of any of the foregoing embodiments may additionally and/or alternatively include the process further comprising preventing an offline first battery from overheating and out-gassing and preventing an offline second battery from overheating and out-gassing.

A further embodiment of any of the foregoing embodiments may additionally and/or alternatively include the process further comprising utilizing at least one of a first battery current, and a second battery current in at least one of connecting to the load, charging another battery, dumping thermal energy and combinations thereof.

A further embodiment of any of the foregoing embodiments may additionally and/or alternatively include the process further comprising configuring the controller to transfer a charge from the first battery to the second battery responsive to the first battery being offline and the second battery being online.

A further embodiment of any of the foregoing embodiments may additionally and/or alternatively include the process further comprising determining at least one of a battery impedance, a battery voltage, and a battery temperature by using at least one of the first telemetry unit, and the second telemetry unit.

A further embodiment of any of the foregoing embodiments may additionally and/or alternatively include the process further comprising operatively connecting a first squib multiplexer in with a first squib unit operatively connected to the first battery; operatively connecting a second squib multiplexer with the second squib unit operatively connected to the second battery; operatively connecting a squib driver circuit unit with each of the first squib unit and second squib unit; and operatively connecting a firing interlock logic unit with each of the first squib unit and second squib unit; and configuring the controller and a guidance electronics unit to activate each of the first battery and second battery.

A further embodiment of any of the foregoing embodiments may additionally and/or alternatively include the process further comprising controlling a first power switch with the controller; controlling a second power switch with the controller.

Other details of the power management unit architecture are set forth in the following detailed description and the accompanying drawing wherein like reference numerals depict like elements.

BRIEF DESCRIPTION OF THE DRAWINGS

FIG. 1 is a schematic representation of an exemplary power management unit architecture.

DETAILED DESCRIPTION

Referring now to FIG. 1, a power management unit architecture 10 is shown. A grouping of batteries 12 can be used to energize an electrical load 14. The electrical load 14 can be part of a missile, such as a control actuation system (not shown). The batteries 12 can be thermal batteries, lead acid batteries, Li-Ion and the like. The batteries 12 are connected to a bus 16 with a positive side 18 and a negative side 20. A first battery 22 is activated and connected to the electrical load 14 before a second battery 24 is activated and connected to the electrical load 14. Lastly, a third battery or nth battery 26 can be activated and connected to the electrical load 14 subsequently after the second battery 24. It is contemplated that any number of batteries 12 can be utilized depending on the mission and needs of the load 14. The bus 16 connects the batteries 12 to the load 14. The electrical load 14 can be supplied sequentially by a first battery current 28 from the first battery 22, and a second battery current 30 from the second battery 24, and an nth battery current 32 from the nth battery 26.

The power management unit architecture 10 includes the first battery 22 in operative communication with the electrical load 14. The second battery 24 can be in operative communication with the electrical load 14 and in operative communication with the first battery 22. The nth battery 26 can be in operative communication with the electrical load 14 and in operative communication with the first battery 22, the second battery 24 and up to an n−1th battery.

A digital signal processing system or simply controller 34 can be in operative communication with the first battery 22, the second battery 24 and all batteries up to the nth battery 26. The controller 34 can include hardware, firmware, and/or software components that are configured to perform the functions disclosed herein, including the functions of the power management unit architecture 10. While not specifically shown, the controller 34 may include other computing devices (e.g., servers, mobile computing devices, FPGAs, programmable logic devices, etc.) which may be in communication with each other and/or the controller 34 via a communication network 36 to perform one or more of the disclosed functions. The controller 34 may include at least one processor 38 (e.g., a controller, microprocessor, microcontroller, digital signal processor, etc.), memory 40, and an input/output (I/O) subsystem 42. The controller 34 may be embodied as any type of computing device e.g., a network of computers, a combination of computers and other electronic devices, or other electronic devices. Although not specifically shown, the I/O subsystem 42 typically includes, for example, an I/O controller, a memory controller, and one or more I/O ports. The processor 38 and the I/O subsystem 42 are communicatively coupled to the memory 40. The memory 40 may be embodied as any type of computer memory device (e.g., volatile memory such as various forms of random access memory).

The first battery 22 is the initial battery to be activated. At a predetermined state, the second battery 24 can be activated and up to the nth battery 26 can be activated in sequence. For a very brief period of time, both the first battery 22 and the second battery 24 are active and online with the load 14. The second battery 24 upon activation, goes online and picks up the load duty. The first battery 22 becomes offline. The power management unit architecture 10 is configured to prevent the offline first battery 22 from overheating and out-gassing during its offline stage, since the first battery 22 is still activated and has the potential to overheat. Periodically, the first battery current 28 is drawn off the first battery 22 and utilized either in the second battery 24 or on the load 14 or dumped as thermal energy or all of the above.

A first squib unit 44 is connected to the first battery. The first squib unit 44 is utilized to activate the first battery 22. A second squib unit 46 is connected to the second battery 24. An nth squib unit 48 is connected to the nth battery 26. In an exemplary embodiment, the squib unit 44, 46, 48 is a chemical that heats an electrolyte, producing voltage and current. In an exemplary embodiment, the squib unit 44, 46, 48 can include a bridge wire heating element that activates heat pellets, melts electrolyte which then produces voltage and current.

A first squib multiplexer (MUX) 50 is operatively connected to the first squib unit 44. A second squib multiplexer (MUX) 52 is operatively connected to the second squib unit 46. An nth squib multiplexer (MUX) 54 is operatively connected to the nth squib unit 46.

A squib driver circuit unit 56 is in operative communication with each of the squib units 44, 46, 48 via squib driver circuit 58. The squib driver circuit unit 56 is in operative communication with the controller 34. A squib power source 60 is operatively connected to the squib driver circuit unit 56 via a bus voltage sensor 62. The bus voltage sensor 62 is also in operative communication with the controller 34 and a DC-DC converter 66. The DC-DC converter 66 is connected to the bus 16. The squib driver circuit unit 56 and DC-DC converter 66 are in operative communication with ground 68.

A firing interlock logic unit 70 is operatively connected to the squib MUX 50, 52, 54 via a squib MUX control circuit 72. The firing interlock logic unit 70 is operatively connected to the controller 34 via fire command circuit 74 and bus sequence circuit 76. The firing interlock logic unit 70 can receive command inputs, such as pre-arm command, arm command and fire command from the guidance electronic unit (GEU) 78.

A first power switch 80 is in operative connection with the first battery 22, controller 34 and bus 16. A second power switch 82 is in operative connection with the second battery 24, controller 34 and bus 16. An nth power switch 84 is in operative connection with the nth battery, controller 34 and bus 16.

The power management unit architecture 10 includes a voltage sensing circuit 86 operatively connected between the controller 34 and the batteries 12. The voltage sensing circuit 86 can be operatively connected to a first voltage sensor 88 associated with the first battery 22. The voltage sensing circuit 86 can be operatively connected to a second voltage sensor 90 associated with the second battery 24. The voltage sensing circuit 86 can be operatively connected to an nth voltage sensor 92 associated with the nth battery 26. In an exemplary embodiment, the voltage sensors 88, 90, 92 can include a first resistor in series with a second resistor (not shown). The voltage sensing circuit 86 indicates a battery voltage 94.

The power management unit architecture 10 includes a temperature sensing circuit operatively connected between the controller 34 and the batteries 12. The temperature sensing circuit 96 can be operatively connected to a first temperature sensor 98 associated with the first battery 22. The temperature sensing circuit 96 can be operatively connected to a second temperature sensor 100 associated with the second battery 24. The temperature sensing circuit 96 can be operatively connected to an nth temperature sensor 102 associated with the nth battery 26.

A first telemetry unit 104 can be operatively connected to the first voltage sensor 88 and the first temperature sensor 98 and operatively connected to the first battery 22 and controller 34.

A second telemetry unit 106 can be operatively connected to the second voltage sensor 90 and the second temperature sensor 100 and operatively connected to the second battery 22 and controller 34.

An nth telemetry unit 108 can be operatively connected to the nth voltage sensor 92 and the nth temperature sensor 102 and operatively connected to the nth battery 22 and controller 34. The telemetry units 104, 106, 108 are configured for telemetry. Telemetry is an automated process used to collect measurements and other types of data remotely. The data is sent between devices and monitored for analysis to improve device performance.

A current sensing circuit 110 can be operatively connected between the controller 34 and a current sensor 112 in operative connection with the positive leg 18 of the bus 16. The current sensing circuit 52 can include a shunt circuit, a Hall circuit, a current transformer, and the like. The current sensing circuit 52 indicates the current between the bus 16 and the batteries 12.

The power switches 80, 82, 84 can enable a current path between an offline battery 22 and an online battery 24. The power switches 80, 82, 84 can be configured with a transistor, such as for example a power transistor, a Field Effect Transistor (FET), a Metal Oxide Semiconductor Field Effect Transistor (MOSFET), insulated-gate bipolar transistor (IGBT) and the like. The power switches 80, 82, 84 can be configured with a diode, such as a body diode. The power switches 80, 82, 84 can be coupled on the low side of the load 14. The power switches 80, 82, 84 can have the transistor connected to a ground (not shown). The power switches 80, 82, 84 can be in operative communication with an inductor (not shown). The controller 34 can operate the power switches 80, 82, 84 to alter the pathways for the current 28, 30, 32 to flow.

The power switches 80, 82, 84 can utilize silicon carbide technology to improve the packaging and the power density. The power switches 80, 82, 84 can be configured to be scaled. The power switches 80, 82, 84 can enable a path for reverse current into one of the batteries 12 during regeneration from the control actuation system (not shown).

The controller 34 can include an inner loop 114, the inner loop 114 can be configured to control the first battery current 28. The inner loop 114 can be configured to measure a loop error and apply one of a full voltage or no voltage for a predetermined period of time.

The controller 34 can include an outer loop 116. The outer loop 116 can be configured to control the battery 12 voltage.

The controller 34 is configured to transfer a charge from the first battery 22 to the second battery 24 when the first battery 22 is offline and the second battery 24 is online. The controller 34 is configured to measure a battery impedance. The controller 34 is configured to determine an online battery resistance responsive to each of a measurement of the online battery voltage when an inductor (not shown) is connected to the online battery and measurement of the online battery voltage when the inductor is disconnected from the online battery.

The power management unit architecture begins operation when the firing interlock logic 70 receives a battery firing pulse or firing command sequence from the GEU 78. Once the first battery 22 is fired, the on-board controller 34 collects voltage, current and temperature telemetry. Based on this data, the controller 34 assesses the state-of-charge (SOC) and impedance of the battery 22. If the battery 22 falls below a desired SOC or the battery 22 cannot deliver sufficient power to meet demands, the controller 34 automatically fires the next battery 24, using the operating battery 22 as a power source and an on-board squib driver 56. To conserve board real-estate, the squib driver 56 can be connected to any of the battery bridge wires thru a bank of load switches. After the battery 24 comes up to its desired voltage, the discharged battery 22 is taken offline and the new battery 24 is connected to the bus 16 thru a power switch topology. The offline battery 22 can be connected to a dissipation resistor to prevent thermal runaway. This process continues and ultimately employs the nth battery until the mission is completed.

A technical advantage of the disclosed power management unit architecture includes enabling thermal batteries to support mission durations greater than 10 minutes.

Another technical advantage of the disclosed power management unit architecture includes better battery utilization, significantly reduces heat generation.

Another technical advantage of the disclosed power management unit architecture includes smart battery firing decisions made by the controller based on collected battery voltage, current, and temperature telemetry.

Another technical advantage of the disclosed power management unit architecture includes squib power for subsequent firings provided by either external squib power source or an active battery thru a buck regulator.

Another technical advantage of the disclosed power management unit architecture includes a system that has a common squib driver multiplexed across all battery stages using HS/LS power switches. HS/LS power switches isolate bridge wires in the event of a case short.

Another technical advantage of the disclosed power management unit architecture includes batteries are taken on and offline by SiC switch blocks.

Another technical advantage of the disclosed power management unit architecture includes switch blocks that can act as synchronous rectifiers, control dumping and enable regeneration.

Another technical advantage of the disclosed power management unit architecture includes and interlock logic that inhibits the controller from firing any subsequent batteries until the source fire command is received from the guidance electronic unit (GEU).

Another technical advantage of the disclosed power management unit architecture includes an independent logic power supply which enhances safety by permitting the squib power supply to be switched upstream.

Another technical advantage of the disclosed power management unit architecture includes an electronic switch with resistor which enables load impedance measurements and Electrochemical Impedance Spectroscopy (EIS).

Another technical advantage of the disclosed power management unit architecture includes an initial guidance electronics unit firing can be performed by either directly or through a digital interface.

Another technical advantage of the disclosed power management unit architecture includes a logic that allows for the first battery to be fired at the beginning of the mission, and subsequent battery stages can be fired by the controller based on the battery capability to support longer missions.

Another technical advantage of the disclosed power management unit architecture includes a flexible architecture scalable to higher or lower power systems.

Another technical advantage of the disclosed power management unit architecture includes battery telemetry information which permits the controller to make smart firing decisions, based on the online battery's impedance or state-of-charge.

Another technical advantage of the disclosed power management unit architecture includes telemetry which includes battery voltage, bus current, and environmental temperature.

There has been provided a power management unit architecture. While the power management unit architecture has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A power management unit architecture comprising:
    a first battery in operative communication with an electrical load via a bus;
    a second battery in operative communication with the electrical load via the bus and in operative communication with the first battery;
    an nth battery in operative communication with electrical load via the bus and in operative communication with an n−1th battery;
    a controller in operative communication with the first battery, the second battery and up to the nth battery;
    a first telemetry unit in operative communication with the controller and the first battery;
    a second telemetry unit in operative communication with the controller and the second battery;
    an nth telemetry unit in operative communication with the controller and the nth battery;

a first power switch in operative communication with the controller, the first battery and the bus;
a second power switch in operative communication with the controller, and the second battery and the bus;
an nth power switch in operative communication with the controller, and the nth battery and the bus;
a first squib unit operatively connected to the first battery;
a second squib unit operatively connected to the second battery;
an nth squib unit operatively connected to the nth battery, wherein the controller is configured to pull a first battery current from the first battery and drive the first battery current into the second battery responsive to a predetermined current; and the controller is configured to pull a second battery current from the second battery and drive the second battery current to an n−1th battery up to the nth battery responsive to a predetermined current.

2. The power management unit architecture according to claim 1, wherein the first battery is a thermal battery; the second battery is a thermal battery;
and up to the nth battery is a thermal battery.

3. The power management unit architecture according to claim 1, wherein the first battery is activated and connected to the electrical load before the second battery is activated and connected to the electrical load and an n−1th battery is activated and connected to the electrical load before the nth battery is activated and connected to the electrical load.

4. The power management unit architecture according to claim 3, wherein the controller is configured to prevent the offline first battery from overheating and out-gassing and prevent the offline second battery from overheating and out-gassing.

5. The power management unit architecture according to claim 4, wherein periodically, at least one of a first battery current, a second battery current and up to an nth battery current are utilized in at least one of being applied to the load, charging another battery, being dumped as thermal energy and combinations thereof.

6. The power management unit architecture according to claim 1, wherein the controller is configured to pull at least one of the first battery current from the first battery and the second battery current from the second battery and up to an n−1th battery until a battery voltage reaches a target voltage of 10 percent of a full voltage value.

7. The power management unit architecture according to claim 1, wherein the controller is configured to transfer a charge from the first battery to the second battery, wherein the first battery is offline and the second battery is online; and
wherein the controller is configured to transfer a charge from an n−1th battery to the nth battery, wherein the n−1th battery is offline and the nth battery is online.

8. The power management unit architecture according to claim 1, wherein the first telemetry unit, second telemetry unit and up to nth telemetry unit are configured to determine at least one of a battery impedance, a battery voltage, and a battery temperature.

9. The power management unit architecture according to claim 1, further comprising:
a first squib multiplexer in operative communication with the first squib unit;
a second squib multiplexer in operative communication with the second squib unit; and
up to an nth squib multiplexer in operative communication with the nth squib unit;
a squib driver circuit unit in operative communication with each of the first squib unit, the second squib unit and up to the nth squib unit;
a firing interlock logic unit in operative communication with each of the first squib unit, the second squib unit and up to the nth squib unit, the controller and a guidance electronics unit configured to activate each of the first battery, the second battery and up to the nth battery.

10. A process for sequential activation of batteries connected to an electrical load comprising:
operatively connecting a first battery with the electrical load;
subsequently operatively connecting a second battery with the electrical load and operatively connecting the second battery in communication with the first battery;
operatively connecting a controller in operative communication with first the battery and the second battery;
operatively connecting a first telemetry unit in operative communication with the controller and the first battery;
operatively connecting a second telemetry unit in operative communication with the controller and the second battery; and
configuring the controller to pull a first battery current from the first battery and drive the first battery current into the second battery responsive to a predetermined current.

11. The process of claim 10, wherein the first battery is a thermal battery and the second battery is a thermal battery.

12. The process of claim 10, further comprising:
activating and connecting the first battery to the electrical load before activating and connecting the second battery to the electrical load.

13. The process of claim 10, further comprising:
configuring the controller to pull the first battery current from the first battery until the first battery voltage reaches a target voltage of 10 percent of a full voltage value.

14. The process of claim 13, further comprising:
preventing an offline first battery from overheating and out-gassing and preventing an offline second battery from overheating and out-gassing.

15. The process of claim 10, further comprising:
utilizing at least one of a first battery current, and a second battery current in at least one of connecting to the load, charging another battery, dumping thermal energy and combinations thereof.

16. The process of claim 10, further comprising:
configuring the controller to transfer a charge from the first battery to the second battery responsive to the first battery being offline and the second battery being online.

17. The process of claim 10, further comprising:
determining at least one of a battery impedance, a battery voltage, and a battery temperature by using at least one of the first telemetry unit, and the second telemetry unit.

18. The process of claim 10, further comprising:
operatively connecting a first squib multiplexer in with a first squib unit operatively connected to the first battery;
operatively connecting a second squib multiplexer with the second squib unit operatively connected to the second battery;
operatively connecting a squib driver circuit unit with each of the first squib unit and second squib unit; and operatively connecting a firing interlock logic unit with each of the first squib unit and second squib unit; and
configuring the controller and a guidance electronics unit to activate each of the first battery and second battery.

19. The process of claim 10 further comprising:
controlling a first power switch with the controller;
controlling a second power switch with the controller.

\* \* \* \* \*